(12) United States Patent
Tobler et al.

(10) Patent No.: US 8,698,415 B2
(45) Date of Patent: *Apr. 15, 2014

(54) CURRENT SUPPLY FOR LUMINESCENT DIODES

(75) Inventors: Felix Tobler, Schanis (CH); Michael Zimmermann, Heiligenkreuz (CH); Stefan Tasch, Jennersdorf (AT)

(73) Assignees: Tridonic Jennersdorf GmbH, Jennersdorf (AT); Tridonic AG, Ennenda (CH)

(*) Notice: Subject to any disclaimer, the term of this patent is extended or adjusted under 35 U.S.C. 154(b) by 77 days.

This patent is subject to a terminal disclaimer.

(21) Appl. No.: 13/272,177

(22) Filed: Oct. 12, 2011

(65) Prior Publication Data
US 2012/0086348 A1    Apr. 12, 2012

Related U.S. Application Data

(60) Division of application No. 11/028,297, filed on Jan. 4, 2005, now Pat. No. 8,063,575, which is a continuation of application No. PCT/EP03/06952, filed on Jun. 30, 2003.

(30) Foreign Application Priority Data

Jul. 4, 2002  (DE) .................................. 102 30 103

(51) Int. Cl.
  G05F 1/00    (2006.01)
  H05B 39/10   (2006.01)
(52) U.S. Cl.
  USPC ........................................... 315/291; 315/90
(58) Field of Classification Search
  USPC ...... 315/248, 224, 209 R, 291, 185 R, 185 S, 315/90, 91, 312, 241 R, 244; 362/613, 227
  See application file for complete search history.

(56) References Cited

U.S. PATENT DOCUMENTS

| 3,535,256 A | 10/1970 | Siano et al. ................. 260/45.75 |
| 3,890,537 A | 6/1975 | Park et al. ...................... 315/208 |

(Continued)

FOREIGN PATENT DOCUMENTS

| DE | 402 24 98 A | 1/1992 | ............... G08B 5/38 |
| DE | 19732828 | 2/1999 | ............... B60Q 1/26 |

(Continued)

OTHER PUBLICATIONS

Office Communication, mailed Nov. 18, 2008, U.S. Appl. No. 11/486,103, filed Jul. 14, 2006, 14 pages.

(Continued)

*Primary Examiner* — Minh D A
(74) *Attorney, Agent, or Firm* — Fitzpatrick, Cella, Harper & Scinto

(57) ABSTRACT

A regulation circuit is provided for making available a constant current supply on the basis of a transformer principle, in which there flows through the luminescent diodes a triangular a.c. current varying periodically around a d.c. current value. Circuitry is provided so that both the charging and the discharging current of an inductive reactance connected in series to the luminescent diodes, functioning as a storage choke for filtering of mains harmonics, flows as diode current through the luminescent diodes. An advantage of this method consists in a significant reduction of the overall power loss of the LED illumination module. According to one embodiment, the ceramic circuit board of the LED illumination module has a direct mains current supply, which, for protection from mechanical damage, is accommodated in a transparent housing having a highly transparent polymer mass serving as an optically active lens surface.

22 Claims, 4 Drawing Sheets

(56) References Cited

U.S. PATENT DOCUMENTS

| | | | | |
|---|---|---|---|---|
| 4,618,257 | A | 10/1986 | Bayne et al. | 356/71 |
| 5,287,372 | A * | 2/1994 | Ortiz | 372/38.07 |
| 5,581,158 | A | 12/1996 | Quazi | 315/149 |
| 5,632,551 | A | 5/1997 | Roney et al. | 362/249 |
| 5,821,634 | A | 10/1998 | Guthrie | 307/10.7 |
| 6,045,240 | A | 4/2000 | Hochstein | 362/294 |
| 6,056,420 | A | 5/2000 | Wilson et al. | 362/249.03 |
| 6,081,378 | A | 6/2000 | Romano et al. | 359/497 |
| 6,105,869 | A | 8/2000 | Scharf et al. | 235/454 |
| 6,113,212 | A | 9/2000 | Ng | 347/18 |
| 6,132,072 | A * | 10/2000 | Turnbull et al. | 362/494 |
| 6,200,134 | B1 | 3/2001 | Kovac et al. | 433/29 |
| 6,283,613 | B1 | 9/2001 | Schaffer | 362/245 |
| 6,307,330 | B1 | 10/2001 | So | 315/291 |
| 6,320,330 | B1 * | 11/2001 | Haavisto et al. | 315/291 |
| 6,345,903 | B1 | 2/2002 | Koike et al. | 362/249 |
| 6,347,880 | B1 * | 2/2002 | Furst et al. | 362/494 |
| 6,375,340 | B1 | 4/2002 | Biebl et al. | 362/249 |
| 6,572,249 | B2 | 6/2003 | Bailey | 362/473 |
| 6,667,583 | B2 * | 12/2003 | Kerenyi | 315/219 |
| 8,207,689 | B2 * | 6/2012 | Tobler et al. | 315/307 |
| 2001/0050371 | A1 * | 12/2001 | Odaki et al. | 257/98 |
| 2002/0158590 | A1 | 10/2002 | Saito et al. | 315/291 |
| 2002/0171379 | A1 | 11/2002 | Adamson | 315/312 |
| 2003/0085749 | A1 | 5/2003 | Xu et al. | 327/423 |
| 2003/0112627 | A1 | 6/2003 | Deese | 362/249 |
| 2003/0209994 | A1 | 11/2003 | Kerenyi, Jr. | 315/219 |
| 2005/0218836 | A1 | 10/2005 | Tobler et al. | 315/291 |
| 2006/0284865 | A1 | 12/2006 | Tobler et al. | 345/214 |

FOREIGN PATENT DOCUMENTS

| | | | | |
|---|---|---|---|---|
| DE | 198 10 827 | A | 9/1999 | G09G 3/14 |
| DE | 19814681 | | 10/1999 | H02M 3/156 |
| DE | 10026661 | A1 | 5/2000 | H01L 25/13 |
| DE | 10047230 | | 5/2001 | H02M 3/155 |
| DE | 10013215 | | 9/2001 | H05B 33/08 |
| DE | 20008346 | U | 9/2001 | H05K 7/02 |
| EP | 0948241 | A | 10/1999 | H05B 33/08 |
| EP | 1033903 | A | 9/2000 | H05B 33/08 |
| FR | 2786652 | A | 6/2000 | H05B 33/08 |
| SU | 1387210 | | 4/1988 | H05K 7/20 |
| WO | 01/45470 | | 6/2001 | H05B 37/02 |
| WO | 02 05356 | A | 1/2002 | H01L 33/00 |
| WO | 02 13231 | A | 2/2002 | H01L 25/075 |

OTHER PUBLICATIONS

Notice of References Cited (PTO-892), mailed Nov. 18, 2008, U.S. Appl. No. 11/486,103, filed Jul. 14, 2006, 1 page.
Office Communication, mailed Jul. 9, 2009, U.S. Appl. No. 11/486,103, filed Jul. 14, 2006, 15 pages.
Notice of References Cited (PTO-892), mailed Jul. 9, 2009, U.S. Appl. No. 11/486,103, filed Jul. 14, 2006, 1 page.
Office Communication, mailed Apr. 6, 2006, U.S. Appl. No. 11/028,297, filed Jan. 4, 2005, 11 pgs.
Notice of References Cited (PTO 892), mailed Apr. 6, 2006, U.S. Appl. No. 11/028,297, filed Jan. 4, 2005, 1 page.
Office Communication, mailed Sep. 8, 2006, U.S. Appl. No. 11/028,297, filed Jan. 4, 2005, 12 pgs.
Notice of References Cited (PTO-892), mailed Sep. 8, 2006, U.S. Appl. No. 11/028,297, filed Jan. 4, 2005, 1 page.
Office Communication, mailed Mar. 28, 2007, U.S. Appl. No. 11/028,297, filed Jan. 4, 2005, 9 pgs.
Notice of References Cited (PTO-892)m mailed Mar. 28, 2007, U.S. Appl. No. 11/028,297, filed Jan. 4, 2005, 1 page.
Office Communication, mailed Oct. 15, 2007, U.S. Appl. No. 11/028,297, filed Jan. 4, 2005, 9 pages.
Office Communication, mailed Mar. 28, 2008, U.S. Appl. No. 11/028,297, filed Jan. 4, 2005, 9 pages.
Office Communication, mailed Sep. 15, 2008, U.S. Appl. No. 11/028,297, filed Jan. 4, 2005, 11 pages.
Office Communication, mailed Mar. 24, 2009, U.S. Appl. No. 11/028,297, filed Jan. 4, 2005, 9 pages.
Office Communication, mailed Nov. 19, 2009, U.S. Appl. No. 11/028,297, filed Jan. 4, 2005, 9 pages.
Office Communication, mailed Jun. 10, 2010, U.S. Appl. No. 11/028,297, filed Jan. 4, 2005, 9 pages.
Notice of References Cited (PTO-892), mailed Jun. 10, 2010, U.S. Appl. No. 11/028,297, filed Jan. 4, 2005, 1 page.
Office Communication, mailed Nov. 18, 2010, U.S. Appl. No. 11/028,297, filed Jan. 4, 2005, 11 pages.
Notice of References Cited 9PTO-892), mailed Nov. 18, 2010, U.S. Appl. No. 11/028,297, filed Jan. 4, 2005, 1 page.
Office Communication, mailed Sep. 29, 2011, U.S. Appl. No. 12/717,824, filed Mar. 4, 2010, 19 pages.
Notice of References Cite (PTO-892), mailed Sep. 29, 2011, U.S. Appl. No. 12/717,824, filed Mar. 4, 2010, 1 page.
"AC Waveforms", http://www.allaboutcircuits.com/vol_2/chpt_1/2.html, cited in Form PTO-892 dated Jun. 10, 2010 in U.S. Appl. No. 11/028,297, last retrieved Oct. 11, 2011.

* cited by examiner

CURRENT SUPPLY FOR LUMINESCENT DIODES

CROSS REFERENCE TO RELATED APPLICATIONS

This Application is a Division of application Ser. No. 11/028,297, filed Jan. 4, 2005, which is a Continuation of application PCT/EP03/06952 filed on Jun. 30, 2003, the entire contents of each of which are incorporated herein by reference, and the latter of which was published in German but not English as WO 2004/006629 A2 on Jan. 15, 2004, the priority of which is claimed herein (35 U.S.C. §120) and which claims priority of German Application No. 102 30 103.4 filed Jul. 4, 2002, the priority of which is also claimed herein (35 U.S.C. §119).

BACKGROUND OF THE INVENTION

1. Field of the Invention

The present invention relates to a current supply for LEDs. Thereby, a transformer principle is put to use which generates a triangular a.c. current, which varies periodically around a d.c. current value, through the luminescent diodes. By means of this process it is provided that both the charging and also discharging current of an inductive reactance in the load circuit flows as diode current through the luminescent diodes.

2. Description of the Related Art

High-power light emitting semiconductor luminescent diodes ("Light-Emitting Diodes", LEDs), briefly referred to as light diodes, have long since achieved their place in many fields in which there is need for optical display systems or illumination systems having low energy consumption, such as e.g. in traffic and signaling technologies. Through decisive technical innovations in the field of light emitting semiconductor components, with the aid of which there can today be obtained a higher light yield and an extension of the color spectrum over the entire wavelength range of visible light between 780 nm (violet) and 380 nm (dark red), optoelectronics is, in terms of lighting technology, embracing completely new markets.

For the attainment of a uniform illumination of surfaces, diffuser plates are employed as a rule. Due to the mains operation, above all in case of outdoor applications, light housings are usually necessary in order to protect the electronic components employed from the penetration of moisture.

In order to understand the central idea of the present invention, there will be briefly explained below the most important features of conventional processes and technologies according to the state of the art for the production of semiconductor luminescent diodes, above all the so-called "Chip-On-Board" (COB) Technology, which has greatly increased in significance in the last few years.

In "Chip-On-Board" (COB) Technology, the raw LED-chip is applied to the circuit board, with conductive adhesive, with the structure and the terminals upwards ("face up"). This procedure is called, in Anglo-American terminology, "die bonding". After the curing of the adhesive there is effected in a further working step the connection of the chip terminals with the circuit board with the aid of a wire bonder, known from the production of integrated circuits. Thereby, the individual chip terminals and the circuit board are connected by a gold wire. Through the employment of special circuit board materials excellent heat conduction properties can be attained. From this there results a longer working life and a higher light yield per unit area. After application of a polymeric layer, the LED array is protected from mechanical damage due to shock or vibrations. Special circuit boards with reflector layers thereby serve for light bundling and increase of light intensities at smaller emission angles.

In comparison to conventional LED modules, through the employment of luminescent diodes which are applied to a circuit board as an LED array by means of COB technology, there can be produced efficient illumination units of high light yield, long working life, space-saving construction and a relatively slight cost outlay. Due to the light current values which can be attained, these modules are interesting not only as signalling or background illumination, but can be directly put to use as illumination means. LED arrays produced with COB technology having an emission angle of 180° permit a bright illumination of surfaces with a homogeneous light distribution, which is comparable with illumination by means of illumination equipment with fluorescent lamps operated at 40 to 50 mA. A further plus point is the 50% lesser current consumption in comparison with such illumination equipment.

Point light sources formed of high power luminescent diodes with COB technologies are ideally suited for small work and reading lights, as flexibly employable light sources in spot illumination, as central light source for orientation lights etc.

From DE 100 26 661 A1 there is known a universal compact LED illumination module which can be employed for indoor and outdoor lights in mains operation and without employment of further operating devices, such as e.g. mains transformers or specially dimensioned switch power unit parts. The light emitting semiconductor components provided as light sources are thereby controlled and supplied with current via a capacitor power unit part. In the preferred embodiment of this invention, the light emitting surfaces of the individual luminescent diodes emerge lens-like from the molding mass. As outer structural form for the LED illumination module disclosed herein there serves a molding mass (e.g. a casting resin) or a housing in which the electronic components are mounted protected from the penetration of moisture. The module can thereby be operated as a lamp or light directly from a current supply mains, can be positioned anywhere, and can be economically produced.

In the case of conventional capacitor power unit parts according to the state of the art (in contrast to the electronic solution in accordance with the invention) the effective value of the input alternating voltage can be selected to be variable (e.g. between 100 $V_{AC}$ and 277 $V_{AC}$); even a supply of the mains part with d.c. voltage is possible.

Since, however, in the case of a capacitor mains power unit circuit the size of the capacitors employed increases strongly with increasing operating power, only low powers can be realized with such a mains power unit with acceptable structural size. Further, the performance of the electrolytic capacitors conventionally employed in the capacitor mains power units deteriorates with a number of operating hours. For the reasons mentioned above there is needed for the operation of high power LEDs (having an operating power of up to 4 W) the employment of alternative electronic solutions.

SUMMARY OF THE INVENTION

Starting from the above-mentioned state of the art, the present invention is concerned with the object of providing a current supply for luminescent diodes which can be adapted in simple manner to different LEDs. Beyond this, naturally, a good efficiency should also be attained.

This object is achieved in accordance with the invention by means of the features of the independent claims. Advantageous exemplary embodiments, which further develop the concept of the invention, are defined in the dependent claims.

The present invention discloses a regulation circuit in accordance with the preamble of claim 1, which can be adapted in simple manner to the prevailing current demands of an LED.

With the employment of the switching principle in accordance with the invention, also a plurality of luminescent diodes connected in series can be connected to low voltages of more than 30 W. The regulation circuit thereby acts as a constant current source.

The process realized with the aid of this regulation circuit works in accordance with a transformer principle, with which there flows through the LED a triangular current periodically varying around a d.c. current value. Thereby, with the aid of a circuitry provision, it is provided that both the charging and also the discharging current of an inductive reactance connected in series to the luminescent diodes as a storage choke flows as diode current through the luminescent diodes. The advantage of this procedure consists in a reduction of the overall power losses of the LED illumination module.

BRIEF DESCRIPTION OF THE DRAWINGS

Below, the invention will be described in more detail with reference to the accompanying drawings.

DETAILED DESCRIPTION OF THE PREFERRED EMBODIMENTS

Figure 1:
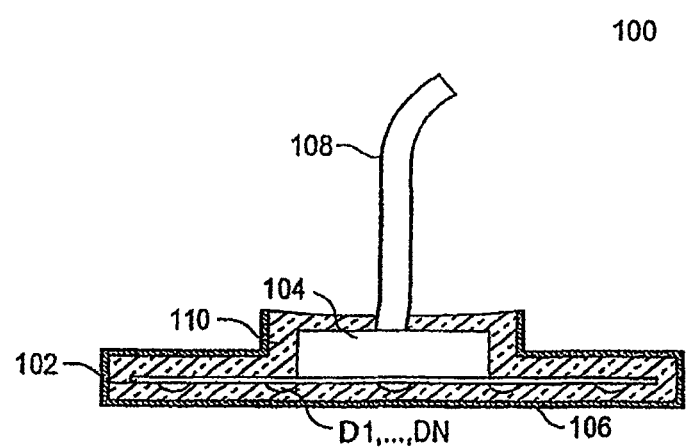
FIG. 1 is an exemplary embodiment of an LED illumination module, comprised of an arrangement of a plurality of luminescent diodes connected in series, fed with a.c. current via a current supply mains, which are applied on a circuit board as LED dice in a "Chip-On-Board" (COB) technology.
Figure 2A:
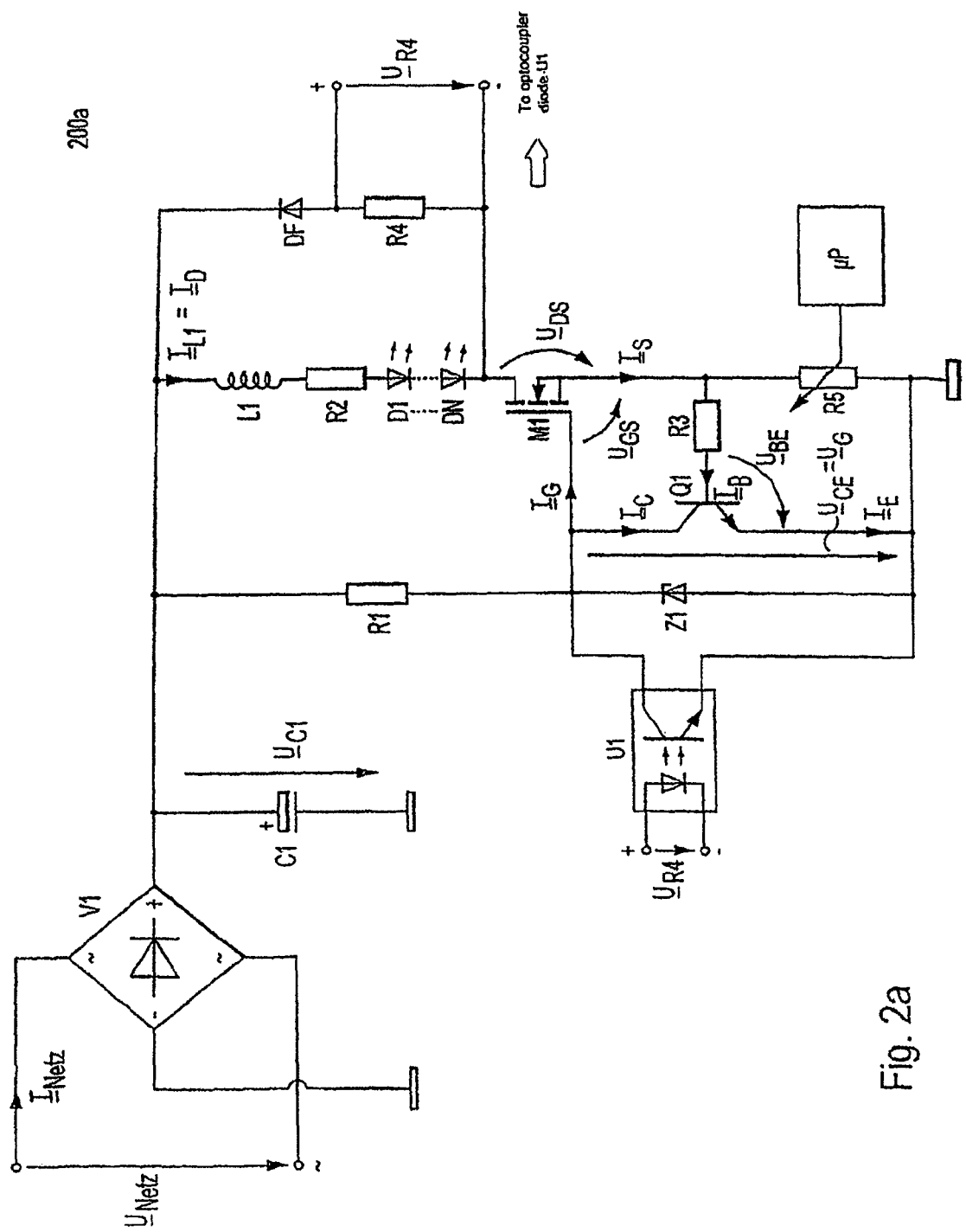
FIG. 2a is a first variant of a regulation circuit for making available a regulated current supply for LEDs, in which a signal transfer member employed in the feedback branch for galvanic decoupling (potential separation) is realized as an opto-coupler diode.
Figure 2B:
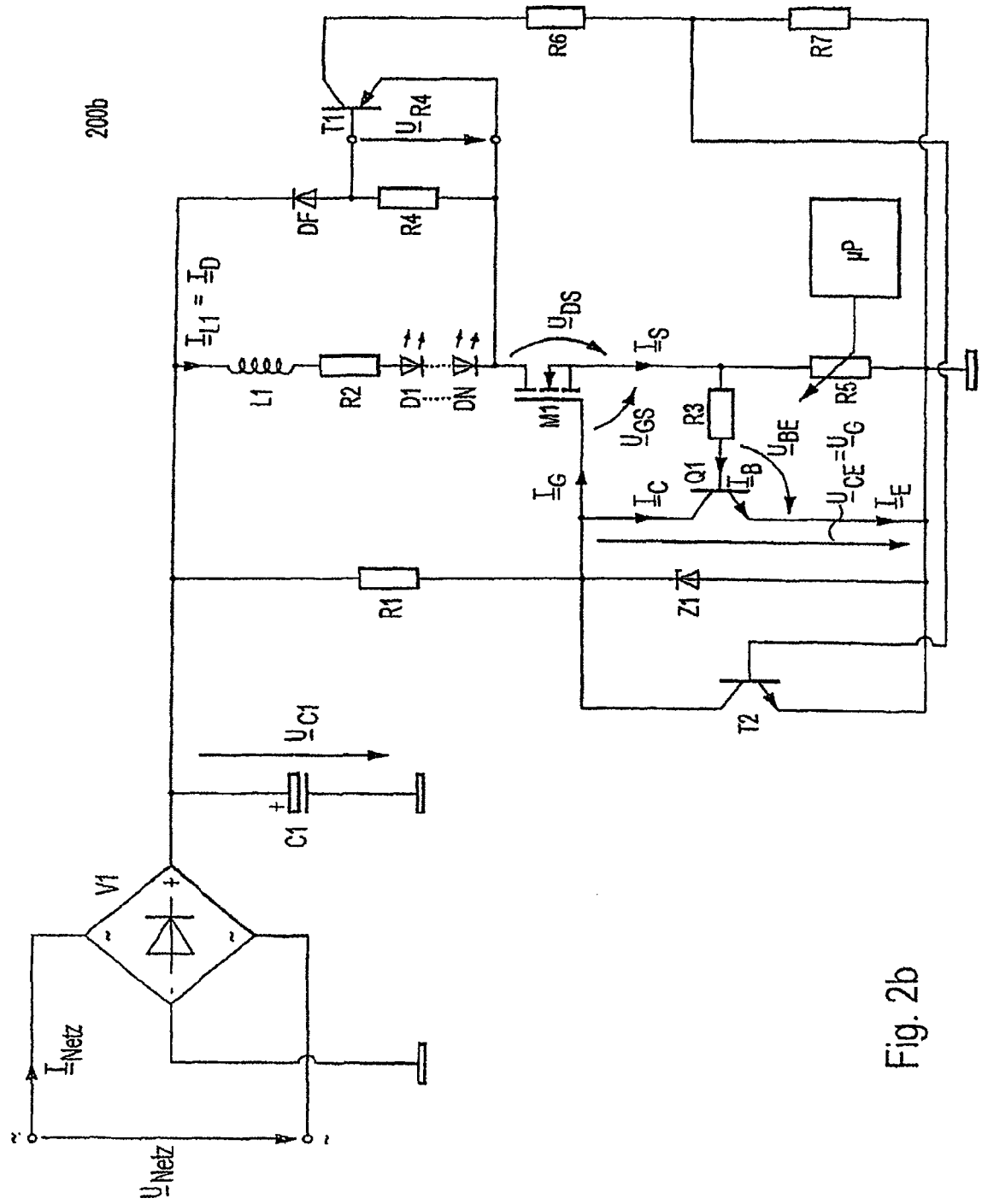
FIG. 2b is a second variant of the regulation circuit in accordance with the invention, for making available a regulated current supply for LEDs, in which a signal transfer member employed in the feedback branch for galvanic decoupling (potential separation) is realized as a level or potential offset stage
Figure 3:
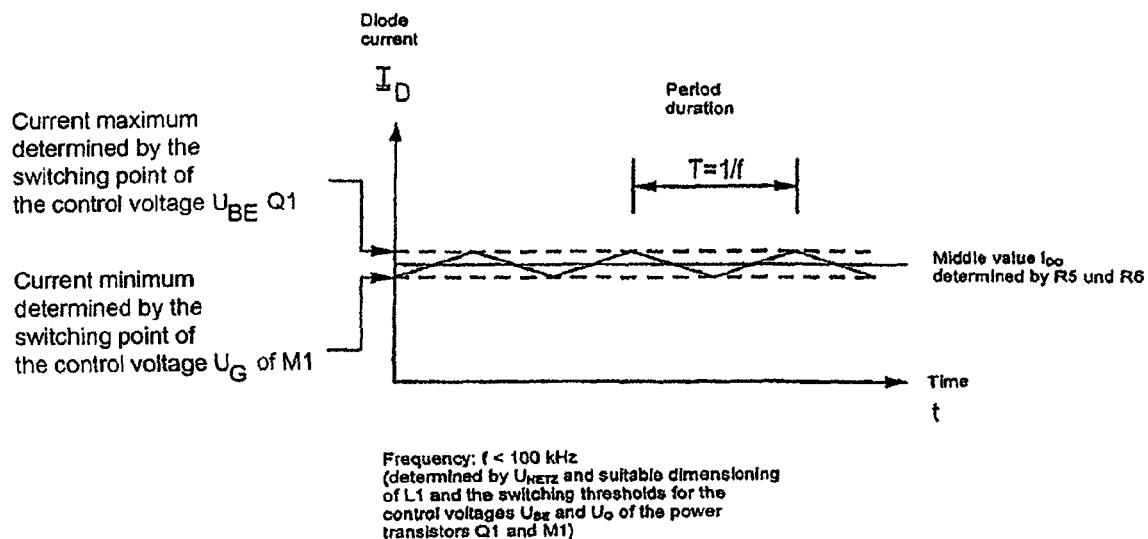
FIG. 3 is a temporal development of the current flowing through a luminescent diode.

In the following, the functions of the component groups contained in an exemplary embodiment of the present invention, as illustrated in FIGS. 1 to 3, will be described in more detail. The significance of the symbols provided with reference signs in FIGS. 1 to 3 can be taken from the accompanying list of reference signs.

In FIG. 1, the basic structure of an LED illumination module 100 is schematically illustrated in longitudinal section. It has an arrangement of luminescent diodes D1, ..., DN, connected in series, fed with a.c. current, which are applied to a circuit board 102 as so called LED dice in a "Chip-On-Board" (COB) technology.

However, the invention can just as well be employed for the control of other configurations of LEDs and in particular an individual LED.

In accordance with an exemplary embodiment of the invention, the heat conducting ceramic circuit board 102 of the LED illumination module 100 has a direct mains current supply, consisting of a mains part 104 and a connection cable, plug and/or socket 108 for connection to an a.c. current mains led out of the mains part 104 to the side. The luminescent diodes D1, ..., DN are accommodated, for protection from mechanical damage, in a transparent housing 106 having a highly transparent polymer mass 110 serving as optically active lens surface.

For attaining a bundled homogeneous light distribution in the region of the main emission directions of the individual luminescent diodes D1, ..., DN, the LED illumination module 100 in accordance with the invention further has so-called Fresnel lenses in the form of a lens plate which is positioned centrally above each luminescent diode D1, ..., DN within the transparent housing, and adhesively fixed at the side.

In order to avoid the occurrence of air bubbles on the side of the circuit board 102 on which the luminescent diodes D1, ..., DN are applied, upon casting of the highly transparent polymeric mass 110 within the transparent housing 106, holes are provided in the circuit board 102. In the production of the LED illumination module 100 the individual unhoused LED diodes D1, ..., DN are, within the framework of an injection molding process or another suitable molding process directly injected around with the highly transparent polymer mass 110. Thereby, the polymer mass 110 is of a thermally good conducting material, which acts in an electrically insulating manner.

Since white light cannot be generated with the aid of individual luminescent diodes there is provided in accordance with the invention the addition of a color conversion medium into the polymer mass 110 in the region of the main emission direction above the position of the monochromatic photon radiation of the luminescent diodes D1, ..., DN emitting in the spectral range of the color blue.

Due to the space saving arrangement of the employed components and the employment of the above-mentioned efficient COB production process, the structural height of the overall arrangement of the LED illumination module 100 in accordance with the invention is not more than for example 1.0 cm.

In accordance with one exemplary embodiment of the basic invention, the individual luminescent diodes D1, ..., DN are dimmable, whereby for dimming the brightness of the photon radiation emitted from them a control via radio or infrared signals or via a microcontroller connected to a bus is conceivable.

For ensuring a direct mains current supply of the circuit board 102, the mains part 104 can in accordance with the invention be operated in a voltage input range from 100V to 277V. Thereby it can also be provided that the mains part 104 can be operated with a.c. voltage and also with d.c. voltage and along with the operation of individual LEDs can be employed for operation with serial connected and also for operation with parallel connected luminescent diodes D1, ..., DN.

The inner sides of the transparent housing 106 (with the exception of the light emitting regions) are, in accordance with the invention, of a thermally good conducting material that on the outside, used for heat discharge, is covered with an electrically non-conducting material. Thereby, the transparent housing 106 can be contacted with the aid of a plug, socket and/or connection cable 108 led out of the housing to the side.

In accordance with one exemplary embodiment of the basic invention it is provided that around each individual luminescent diode D1, ..., DN, formed as LED die, a parabolic or funnel-shaped reflector of a reflector plate of a thermally good conducting highly reflecting material, which reflector plate is electrically insulated on the underside, is placed on the circuit board 102 from above. Each individual reflector thereby is of a plastic with mirrored inner side.

The rear side of the circuit board 102 is, in accordance with the invention, coupled to a cooling body, which serves for transferring the discharge heat arising upon operation of the LED illumination module 100 to the housing 106 or to a holder (not shown).

With reference to FIGS. 2a and 2b, two variants of a regulation circuit in accordance with the invention will now be explained.

Via a rectifier full-bridge circuit V1, the positive and/or mains half-waves of the a.c. current $I_{Netz}$ delivered from a current supply mains are rectified. At the storage capacitor C1, connected with the earth node, at the output of the rectifier full bridge V1 there is thus applied a smoothed and rectified intermediate circuit voltage $U_{C1}$ varying with the mains voltage $U_{netz}$.

After the application of a suitably dimensioned control voltage $U_G$ to the gate of a first semiconductor power switch M1, for example realized as a self-blocking n-channel MOS field effect transistor, this first electronically controllable switching stage is electrically conducting, so that a drain current begins to flow, which as a consequence of the storage choke L1 acting as an energy store, continuously increases and flows as diode current $I_D$ through the luminescent diodes D1, . . . , DN. The rise of this diode current $I_D$ upon charging of the storage choke L1 is detected by a first low-voltage shunt measurement resistance R5, which at the same time is arranged in the load circuit of the first power switch M1 and in the control circuit of the second power switch Q1 and is connected with the earth node. Along with the two power switches M1 and Q1, in accordance with the invention, a time-dependent control for switching over between the charging and discharging processes occurring in the storage choke L1 may be provided.

This shunt measurement resistance R5 may thereby preferably be constituted as a potentiometer for dimming the light intensity $I_V$ [mcd] (i.e. the brightness), proportional to the diode current $I_D$ [mA], of the photon radiation emitted from the luminescent diodes D1, . . . , DN.

Now, as soon as the base-emitter voltage $U_{BE}$ of a second electronically controllable switching stage Q1, formed e.g. as a bipolar npn transistor, reaches in certain switching threshold, the semiconductor power switch Q1 becomes electrically conducting, so that a collector current $I_C$ begins to flow and the gate voltage $U_G$ of the first electronically controllable switching stage M1 temporally sinks to a "low" level, through which the switching stage M1 is in turn blocked for a short time. This has the consequence that the diode current $I_D$ built up via the storage choke L1 is diverted through a free-running diode DF and a second low-voltage shunt measurement resistance R4, connected in series to the free-running diode, in the branch parallel to the series connection of the luminescent diodes D1, . . . , DN and the inductive reactance $X_{L1}$.

With the aid of this relatively simple circuitry measure a danger to the first semiconductor power transistor M1 due to the induction voltage $U_{L1}$ dropped at the inductive reactance $X_{L1}$ upon switching off of the drain current $I_D$ (upon blocking of the M1), which can amount to a multiple of the operating voltage, is avoided.

The voltage $U_{R4}$ dropping at the low-resistance shunt measurement resistor R4 thereby serves for the detection of the decay of the diode current $I_D$ through the luminescent diodes D1, . . . , DN, in the free-running current path, which is bonded to a minimum value by means of the switching threshold of the second electronically controllable switching stage Q1.

After feedback of the diode current $I_D$ flowing through the luminescent diodes D1, . . . , DN, tapped at the second measurement resistor R4, to the control input of the first switching stage M1 via a signal transfer member U1 for galvanic decoupling (potential separation) of the voltage $U_{R4}$ dropping at the second measurement resistance R4 and the gate voltage $U_G$ of the first switching stage M1, this transferred, decaying diode current $I_D$ acts as a "new" gate current $I_G$. This has the consequence that the gate voltage $U_G$ of the first electronically controllable switching stage M1 remains at the level value "low" and thus the switching stage M1 remains blocked for so long until the current flow through the signal transfer member U1 has fallen below a certain threshold. After the switching stage M1 has begun again to conduct, the above described procedure is continued in a periodically recurring sequence.

With the process in accordance with the invention, thus both the charging and also the discharging current $I_{L1}$ of the inductive reactance $X_{L1}$ flow as diode current $I_D$ through the arrangement of the serially connected luminescent diodes D1, . . . , DN of the LED illumination module 100 in accordance with the invention, so that there is provided a triangular current swinging periodically around a middle value.

The signal transfer member U1 employed in the feedback branch of the current $I_D$ flowing through the luminescent diodes D1, . . . , DN, tapped off at the second measurement resistance R4, to the control input of the first switching stage M1, which member is employed for galvanic decoupling (potential separation) of the voltage $U_{R4}$ dropping at the second measurement resistance R4 and the control voltage $U_G$ of the first switching stage M1, may thereby be formed preferably as opto-coupler diode (c.f. FIG. 2a) or as level offset stage (c.f. FIG. 2b). A Zener diode Z1 here serves as voltage limiter for stabilization of the control voltage $U_G$ of the first electronically controllable semiconductor power transistor M1 which can be tapped off at the output terminals of the opto-coupler diode or level offset stage U1.

In the realization of the second variant of the regulation circuit 200b in accordance with the invention, with level or potential offset stage U1, there are needed, additionally to the components necessary for the first variant 200a with opto-coupler diode, two transistor stages T1 and T2 and a voltage divider which is formed by means of the two resistances R6 and R7.

In FIG. 3 the temporal development of the diode current $I_D$ flowing through the luminescent diodes D1, . . . , DN is illustrated. There is involved, as illustrated, a triangular a.c. current periodically oscillating around a middle value, the frequency of which a.c. current is determined by the switching thresholds of the control voltages $U_G$ and $U_{BE}$ needed for control of the two power transistors M1 and Q1, the size of the inductance of the choke coil $L_1$ connected upstream of the luminescent diodes D1, . . . , DN, and the instantaneous value of the intermediate circuit voltage $U_{C1}$ dropping at the storage capacitor C1. For the example sketched out in FIG. 3, these parameters are so dimensioned that the resulting diode current $I_D$ preferably has a frequency of less than 100 kHz.

The d.c. current offset, forming the middle value of the obtained diode current $I_D$, can be set by means of suitable dimensioning of the two shunt measurement resistances R4, R5, in order to adapt the current source to the LED concerned. In this way an economical adaptation of the diode current $I_D$ to differing LEDs is made possible without additional circuitry measures.

In contrast to conventional capacitive mains parts in accordance with the state of the art, the solution in accordance with the invention is substantially more space saving. Beyond this, also application specific integrated circuits (ASICs), having a comparatively small space requirement, are conceivable.

| | List of reference signs |
|---|---|
| No. | Circuitry symbol |
| 100 | LED light strip system, comprised of an arrangement of a plurality of luminescent diodes D1, ..., DN connected in series, fed via a current supply mains with a.c. current $I_{netz?}$ which are applied to a circuit board as LED dice in a "Chip-On-Board" (COB) technology |
| 102 | Heat conductive ceramic circuit board |
| 104 | Mains part for ensuring a direct mains current supply of the circuit board 104 |
| 106 | Transparent housing for protection of the circuit board 102, and the luminescent diodes D1, ..., DN mounted thereon as LED dice, from mechanical damage |
| 108 | Connection cable, plug and/or socket for connection to an AC current mains, led out to the side from the supply part 104 |
| 110 | Highly transparent polymer mass, placed in the transparent housing 108, serving as optically active lens surface |
| 200a | First variant of the regulation circuit in accordance with the invention for making available a regulated current supply for an arrangement of a plurality of luminescent diodes D1, ..., DN of a LED light strip system 100, connected in series, applied to a circuit board 102 as LED dice, fed with a.c. current $I_{NETZ}$ via a current supply mains, in which the signal transfer member employed in the feedback branch for galvanic decoupling (potential separation) is realized as an opto-coupler diode |
| 200b | Second variant of the regulation circuit in accordance with the invention for making available a regulated current supply for an arrangement of a plurality of luminescent diodes D1, ..., DN of a LED light strip system 100, connected in series, applied to a circuit board 102 as LED dice, fed with a.c. current $I_{NETZ}$ via a current supply mains, in which the signal transfer member employed in the feedback branch for galvanic decoupling (potential separation) is realized as a level offset or potential offset stage. |
| 300 | Temporal development of the current $I_D$, flowing through a plurality of series-connected high power luminescent diodes D1, ..., DN of such an LED light strip system, after carrying out the process in accordance with the invention for regulated current supply for such an arrangement |
| C1 | Storage capacitor for making available a smoothed and rectified intermediate circuit voltage $U_{C1}$ (varying with the mains voltage $U_{NETZ}$) at the output of the rectifier full bridge V1 |
| D1, ..., DN | High power luminescent diodes (LEDs) of a LED light strip system, connected in series, applied to a circuit board as LED dice, realized within the scope of a "Chip-On-Board" (COB) technology |
| DF | Free-running diode, connected in parallel to the series connection of the high power luminescent diodes D1, ..., DN and the inductive reactance $X_{L1}$ in the load circuit, for avoiding a danger to the first semiconductor power transistor M1 due to the induction voltage $U_{L1}$, which can amount to a multiple of the operating voltage, dropping at the inductive reactance $X_{L1}$ upon switching off of the drain current ($I_D$) (in the case of a blocking of M1) |
| M1 | First electronically controllable semiconductor power switch, realized as field effect transistor (FET) e.g. as self-blocking n-channel MOSFET having the control voltage $U_G$ |
| Q1 | Second electronically controllable semiconductor power switch, realized as bipolar npn-transistor having the control voltage $U_{BE}$ |
| R1 | Low voltage charge/discharge resistance in the branch parallel to the series circuit of the high power luminescent diodes D1, ..., DN and the inductive reactance $X_{L1}$ |
| R2 | Effective resistance of the ballast choke $L_1$ |
| R3 | Series resistance in the control circuit of the bipolar npn-transistor Q1 |
| R4 | Second low voltage shunt measurement resistance ("shunt") - connected in series to the free-running diode DF - for detecting the decay of diode current $I_D$ in the free-running current path, i.e. in the branch parallel to the series connection of the high power luminescent diodes D1, ..., DN and the storage choke, the diode current flowing through the high power luminescent diodes D1, ..., DN and the storage choke $L_1$ during a discharge process occurring in the storage choke $L_1$, the decay being limited to a minimum value with the aid of the first switching stage M1, |
| R5 | First low voltage shunt measurement resistance ("shunt") for detecting the increase of diode current $I_D$ flowing through the |

-continued

List of reference signs

| No. | Circuitry symbol |
|---|---|
|  | high power luminescent diodes D1, . . . , DN, which increase is restricted to a maximum value with the aid of the second switching stage Q1, the shunt preferably realized as a settable resistor (potentiometer) for brightness dimming of the high power luminescent diodes D1, . . . , DN, which at the same time is arranged in the load circuit of the first power switch M1 and the control circuit of the second power switch Q1, and is also connected with the ground node |
| R6 | First resistance of a voltage divider consisting of R6 and R7 for the level or potential offset stage provided as signal transfer member U1 within the scope of the second variant of the regulation circuit 200b in accordance with the invention |
| R7 | Second resistance of a voltage divider consisting of R6 and R7 for the level or potential offset stage provided as signal transfer member U1 within the scope of the second variant of the regulation circuit 200b in accordance with the invention |
| T1 | First transistor stage, realized as bipolar pnp transistor, for the level or potential offset stage provided within the scope of the second variant of the regulation circuit 200b in accordance with the invention as signal transfer member U1 |
| T2 | Second transistor stage, realized as bipolar npn transistor, for the level or potential offset stage provided within the scope of the second variant of the regulation circuit 200b in accordance with the invention as signal transfer member U1 |
| U1 | Signal transfer member in the feedback branch of the current $I_D$ flowing through the power luminescent diodes D1, . . . , DN, tapped off at the second measurement resistance R4, to the control input of the first switching stage M1, the member for galvanic decoupling (potential separation) of the voltage $U_{R4}$ dropped at the second measurement resistant R4 and the control voltage $U_G$ of the first switching stage M1, realized as opto-coupler diode (c.f. FIG. 2a) or as level or potential offset stage (c.f. FIG. 2b) |
| V1 | Rectifier full bridge for rectifying the positive and/or negative half-waves of the a.c. current $I_{NETZ}$ delivered from a current supply mains |
| $X_{L1}$ | Inductive reactance of a coil L1, as ballast choke for filtering of harmonics, connected in series to the high power luminescent diodes D1, . . . , DN, for extending the current flow duration of the current flowing through the high power luminescent diodes D1, . . . , DN |
| Z1 | Zener diode as voltage limiter for stabilization of the input voltage $U_{Z1}$ at the output terminals 3 and 4 of the opto-coupler diode, level or potential offset stage U1 |
| μP | Microprocessor for regulating the series resistor R3, constituted as a potentiometer for the purpose of dimming the high power luminescent diodes D1, . . . , DN |

The invention claimed is:

1. Current supply circuitry for at least one luminescent diode having:
   at least one inductive reactance connected as a storage choke in series with the luminescent diode(s);
   switching stages for switching over from a charging process to a discharging process in the storage choke when an over-shooting of a threshold value of a first control voltage of the switching stages occurs, and for switching over from a discharging process to a charging process in the storage choke when an under-shooting of a threshold value of a second control voltage of the switching stages occurs; and
   a free running current path, connected in parallel with the series connection of the luminescent diode(s) and the storage choke, for at least a part of the discharge current released by the storage choke to the luminescent diode(s) upon blocking of the first switching stage.

2. The circuitry according to claim 1, comprising a first shunt measurement resistance for detecting the diode current flowing through the luminescent diode(s) during a charging process occurring in the storage choke.

3. The circuitry of claim 1, comprising a second shunt measurement resistance for detecting the diode current flowing through the luminescent diode(s) during a discharge process occurring in the storage choke.

4. The circuitry of claim 3, comprising a signal transfer element for feeding back the current flowing through the luminescent diode(s), tapped off at the second measurement resistance, to the control input of the first switching stage, the member serving for galvanic de-coupling of the voltage dropping at the second measurement resistance and the control voltage of the first switching stage.

5. The circuitry according to claim 4, wherein the signal transfer element employed for potential separation is a level offset stage.

6. The circuitry of claim 1, wherein a free-running diode in the free-running current path is connected anti-parallel to the series circuit of the luminescent diode(s) and the storage choke.

7. The circuitry of claim 1, furthermore comprising a time dependent controller for switching over between the charging and discharging processes occurring in the storage choke.

8. A method for regulating a current supply of at least one luminescent diode comprising:
   charging and discharging current of an inductive reactance connected in series to the luminescent diode(s) as a storage choke, wherein responsive to charging and discharging, current flows as diode current through the luminescent diode(s) and is used for the generation of an alternating current varying periodically about a settable direct current value;
   switching over from a charging process to a discharging process in the storage choke when an over-shooting of a threshold value of a first control voltage of the switching stages occurs, and for switching over from a discharging process to a charging process in the storage choke when an under-shooting of a threshold value of a second control voltage of the switching stages occurs; and
   releasing at least a part of the discharge current by the storage choke to the luminescent diode(s) upon blocking of the switching stages.

9. The method according to claim 8, wherein a direct current offset constituting a middle value of a resulting triangular diode current is set by means of a suitable dimensioning of at least one shunt measurement resistance.

10. A light-emitting diode module, comprising:
   a plurality of series connected light-emitting diodes applied on a circuit board; and
   a regulation circuit for providing a constant current supply, wherein the regulation circuit comprises:
   at least one inductive reactance connected as a storage choke in series with the light-emitting diodes,
   switching stages for switching over from a charging process to a discharging process in the storage choke when an over-shooting of a threshold value of a first control voltage of the switching stages occurs, and for switching over from a discharging process to a charging process in the storage choke when an under-shooting of a threshold value of a second control voltage of the switching stages occurs, and
   a free running current path, connected in parallel to the series connection of the light-emitting diodes and the storage choke, for at least a part of the discharge current released by the storage choke to the light-emitting diodes upon blocking of the first switching stage.

11. The light-emitting diode module of claim 10, wherein the light-emitting diodes are applied to the circuit board in a Chip-On-Board technology.

12. The light-emitting diode module of claim 10, wherein the light-emitting diode module is accommodated in a transparent housing.

13. The light-emitting diode module of claim 12, wherein Fresnel lenses, each in the form of a lens plate for the attainment of a bundled homogenous light distribution in the region of the main emission directions, are positioned centrally above each light-emitting diode within the transparent housing.

14. The light-emitting diode module of claim 12, wherein the inner sides of the transparent housing, with the exception of the light emitting region, are of a material having good thermal conduction properties, which on the outer side for heat discharge is covered over with an electrically non-conducting material.

15. The light-emitting diode module of claim 12, wherein the transparent housing can be contacted with the aid of a plug, socket and/or connection cable light-emitting diode out of the housing to the side.

16. The light-emitting diode module of claim 10, further including a parabolic or funnel-shaped reflector of a reflector plate, formed of a highly reflecting material having good thermal conductive properties, which is electrically insulated on the underside of the reflector, wherein the reflector is disposed around each light-emitting diode, and where the reflector is constructed to be placed around the light-emitting diode from above the circuit board.

17. The light-emitting diode module according to claim 16, wherein each individual reflector is formed of a plastic having a mirrored inner side.

18. The light-emitting diode module of claim 10, wherein the rear side of the circuit board couples the light-emitting diodes to a cooling body, which is constructed to transfer heat arising from operation of the light-emitting diode illumination module to the housing or a mounting.

19. A method for producing the light-emitting diode module of claim 10, comprising assembling the light-emitting diodes of the light-emitting diode illumination module directly with a highly transparent polymer mass.

20. The method of claim 19, wherein assembling includes molding directly unhoused light-emitting diodes with the polymer mass in an injection molding process and/or by means of a casting process.

21. The method of claim 19, wherein at least one light-emitting diode is a blue light-emitting diode which produces white light by means of a color conversion layer arranged above the light-emitting diode.

22. The module of claim 10, wherein at least one light-emitting diode is a blue light-emitting diode which produces white light by means of a color conversion layer arranged above the light-emitting diode.

* * * * *